May 26, 1970 KARL-HEINZ WIDDEL 3,514,540

TOLL CHARGE INFORMING APPARATUS

Filed Sept. 9, 1965 2 Sheets-Sheet 2

United States Patent Office 3,514,540

Patented May 26, 1970

3,514,540

TOLL CHARGE INFORMING APPARATUS

Karl-Heinz Widdel, Krailling, near Munich, Germany, assignor to Siemens Aktiengesellschaft, Munich, Germany Filed Sept. 9, 1965, Ser. No. 486,037
Claims priority, application Germany, Sept. 25, 1964, S 93,350
Int. Cl. H04m *15/10*
U.S. Cl. 179—7 5 Claims

ABSTRACT OF THE DISCLOSURE

Apparatus for informing telephone subscribers of toll charges after a call is completed, in a central charge register system. The central charge register actuates an automatic charge informing apparatus under control of a comparator sensing identity between the address of the subscriber requesting the toll charge and the address of the charge corresponding to that subscriber, in the central charge register.

REFERENCE TO RELATED APPLICATION

Figure 1:
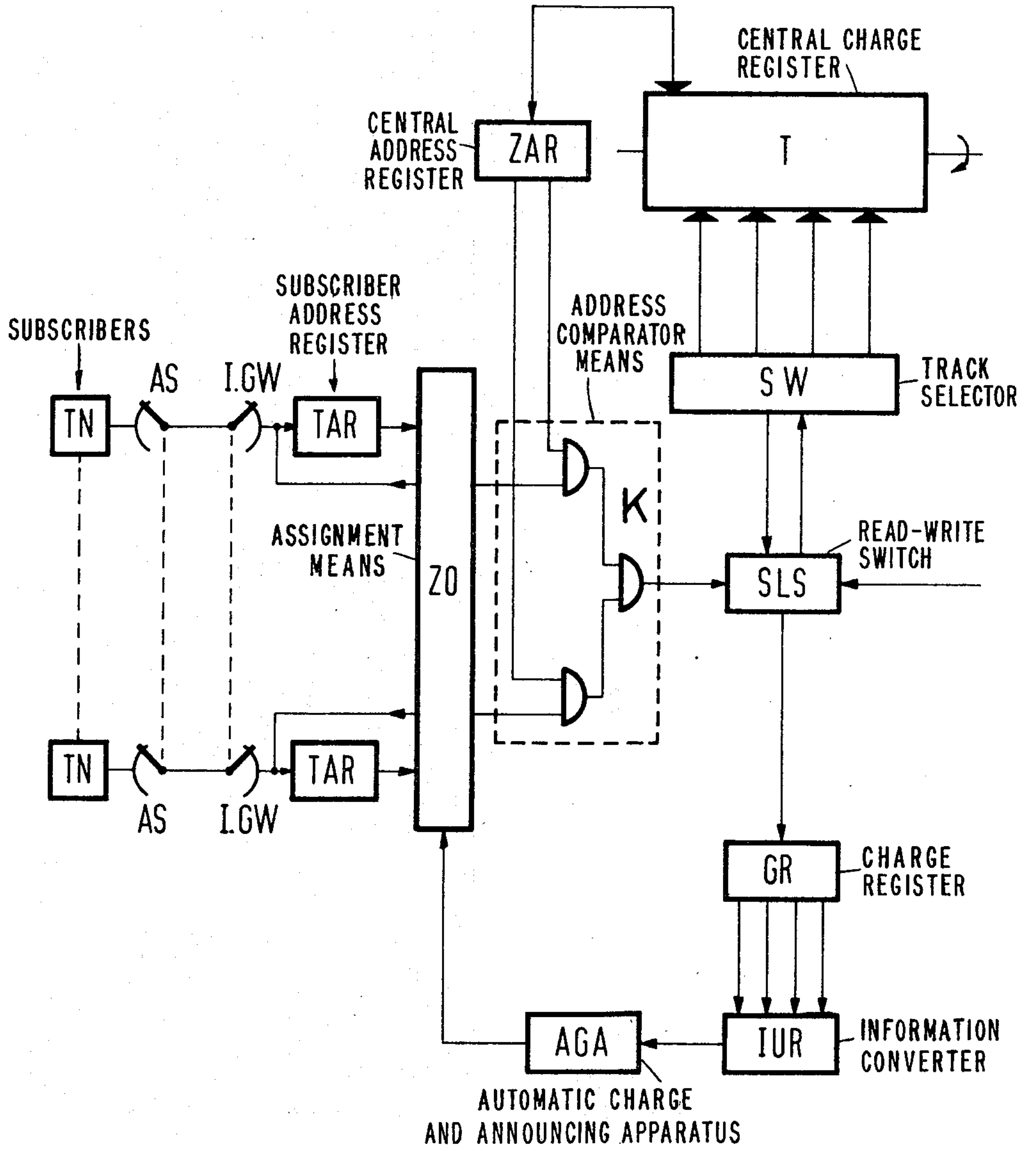

Applicant claims priority from corresponding German application Ser. No. S 93,350, filed Sept. 25, 1964.

GENERAL DESCRIPTION

This invention relates to a central arrangement for informing subscribers of toll charges, in a telephone toll charge register system. In arrangements of the kind to which this invention relates, a central register has one position within the register individually assigned to each subscriber and the charges accumulated during a call are additively registered in that position. Moreover, the charges registered in that position are available for evaluation for the purpose of rendering a bill periodically after the passage of a predetermined time period, such as a month.

In many cases it is desirable to be able to make the charge status available to the subscriber, or at least to the user of the telephone, immediately at the end of a call. This is particularly true in hotels, or restaurants, and so forth.

In accordance with the invention, the object of furnishing toll charge information to a subscriber upon termination of a call is achieved by control of the central register apparatus through an identification or information signal demanding such automatic transmission of information, such signal either being emitted by the subscriber or being stored at the central location. In the case of reception of such identification, the apparatus of the invention compares the address of the register position with the subscriber address and causes transmission of the charges in suitable form when identity is obtained between such addresses.

Automatic charge transmission can be initiated in accordance with the invention in several different ways. For instance, it is possible to arrange for the subscriber to emit a suitable identifying signal, such as an identification digit, or the application of ground to one of the speech conductors by suitable operation of a push button. Moreover, in arrangements in which the subscribers are given different classifications in accordance with special requirements or authorizations, an authorization for charge transmission may be stored at the central register, so that such authorization will be available for comparison with the address of the calling station and will automatically cause transmission of charge information upon completion of a call from such an authorized station. Moreover, a distinction can be made between subscribers desiring a charge transmission for each connection and those who desire such a transmission only for expensive connections of over a certain minimum. Also, a distinction can be made between subscribers desiring an immediate charge at the end of each call and those who additionally or even alternatively demand a charge transmission in the form of charge slips. Such charge slips can also be sent to such subscribers at the end of each call in the form of a telegram.

It is evident that it is necessary to register the subscriber address in a suitable register for the control of the central register to read out therefrom the charge information stored in a position corresponding to that subscriber address. In systems which operate without identification of subscribers, an appropriate information emission can be provided by the subscriber himself at the end of a call. In systems which operate with subscriber identification means, however, the identified subscriber address can be registered automatically so that the subscriber address registers are suitably permanently assigned to the subscriber supply apparatus.

In order to shorten the waiting period for charge transmission, and also to further decrease the cost of the system, it is possible to selectively assign the subscriber address register to the particular subscriber, over an assignment arrangement, for a charge transmission.

STATE OF THE PRIOR ART

Circuit arrangements of the type to which this invention relates employ a central charge register, which may be of the magnetic drum type wherein a number of tracks on the drum provide a suitable number of storage positions. These storage positions may be supplied through a suitable control mechanism with current counting of pulses which are additively combined in the respective positions so as to indicate the total charges run up by that subscriber, to date. This type of system provides for the simple and inexpensive reading of subscriber charges, and for mechanized billing of such charges at appropriate intervals. The system is an alternative to the type employing subscriber meters which are provided with high frequency counting pulses to show the current charge status to the subscriber, up to date. However, by substituting for the subscriber meter system, one also loses the opportunity of subscriber notification at the end of the call of the charges run up during that call.

It is also true that in certain modern automatic dialing offices, there is no longer available a special operator who can inform the subscriber of the charges run up during a call. In any event, the trend is toward elimination of as many human operators as possible, for efficiency and cost reduction reasons. The apparatus of the present invention is designed to cooperate in such an endeavor.

DESCRIPTION OF THE INVENTION

The invention will now be more fully described in conjunction with operative embodiments thereof shown in the accompanying drawings.

Figure 2:
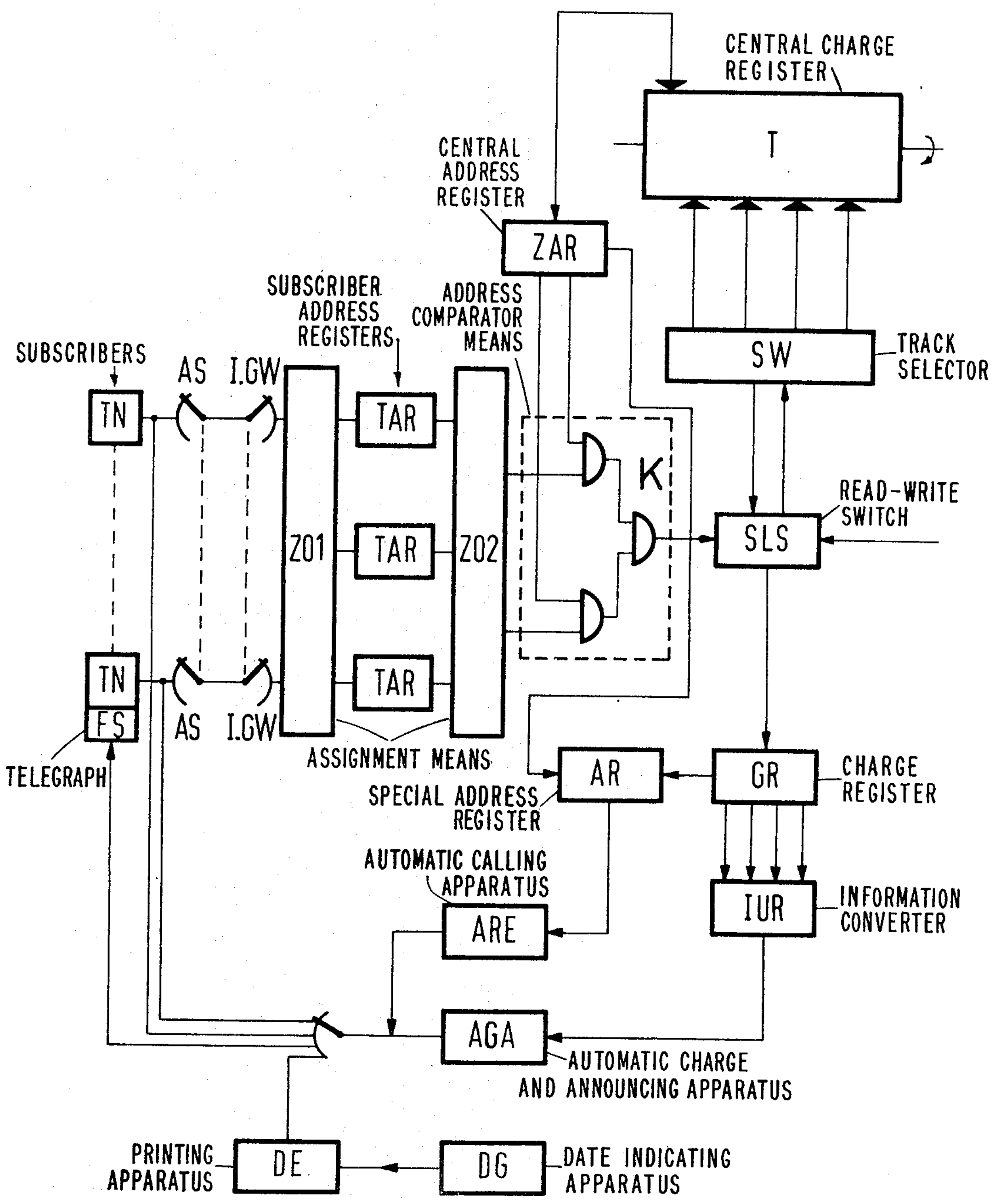

In the drawings:

FIG. 1 is a block diagram showing of one operative embodiment of the invention; and, FIG. 2 is a block diagram showing of a second operative embodiment of the invention.

In the apparatus of FIG. 1 the central charge register T is indicated as of the rotating drum type by the arrow associated with the showing of the shaft at the right end of the register. However, it will be apparent that a magnetic array type of storage apparatus could be employed with suitable simple modifications of the control apparatus. In any event, it will be realized that the particular type of charge register employed is not critical to the present invention, it being necessary only that a central charge register of some type be used, whereupon the control apparatus of the invention can be suitably designed for access to and control of the output of that register.

To explain automatic charge transmission in accordance with the apparatus of FIG. 1, it is presumed that one of the two shown subscribers TN, forming parts of the system of subscribers connected to a common central office, has demanded charge notification at the end of the call, such as by emission of an appropriate identification, as by selection of his own calling number. In such case the calling number dispatched by the subscriber TN is registered in one of several subscriber address registers TAR, which is controlled by the first group dial selector I. GW, during the hunting operation. The group selector of course is controlled from the call finder AS, in customary fashion.

The subscriber address register TAR is connected to the address comparator means K, through a suitable assignment device ZO.

The comparator K is also provided with the output of the central address register ZAR, which is supplied with inputs from the central charge register T. This register ZAR receives successively-changing addresses, depending upon the instantaneous position of the central charge register T. These addresses identify the charge position of the central charge register then being scanned by appropriate scanning apparatus.

Upon indication of identity between the output of the central address register ZAR and then then-connected subscriber address register TAR, indicating a desire for charge notification, the read-write switch SLS is operated and the charge status which is then being read from the register T. These addresses identify the charge position charge register GR. The read-write switch and track selector of course may be of suitable design such as to permit reading into the charge register of the charge information just read from the track and charge position appropriate to the subscriber asking for charge information.

The output of the charge register GR may then be supplied to an information converter IUR. The charge converter IUR is provided to convert the charge information from the central charge register T into a code suitable for charge transmission, as from the binary to the decimal form. As indicated in FIG. 1, charge notification may be oral by a suitable acoustical transducer forming a part of the automatic charge announcing apparatus AGA. Also, a different code can be employed for the setting of a register or meter in different position values, as for example a code in the form of different frequencies.

The converted charge status is then fed from the automatic charge announcement apparatus AGA into the connection which is still retained intact by the assigning apparatus ZO. Through a special release arrangement (not shown) the connection may be released after one or after repeated anouncements.

If only one apparatus for automatic charge announcement is available, together with one information converter, there may arise waiting periods for subscribers who simultneously desire charge announcements, since only one automatic charge transmission can be made at one time for one subscriber. The apparatus of FIG. 2 is provided to avoid these waiting periods and employs an automatic calling arrangement for charge transmission. In the apparatus of FIG. 2, an assignment apparatus ZO in effect commutates the subscriber lines to a free or available subscriber address register TAR. After the subscriber provides for a identification emission to demand a charge notification, the subscriber can release the connection and he will be called automatically from the automatic calling apparatus ARE, when the charge information is available for him.

A second assignment apparatus ZO2 scans all subscriber address registers TAR, one after the other, until the retransmission of the charge status can take place, upon accord of the compared addresses, as described in conjunction with FIG. 1. Since the scanning of the subscriber address registers TAR ends after the subscriber is switched off, the automatic calling arrangement ARE must now be actuated to call the subscriber. This arrangement is controlled by a special address register AR which is provided with information originating from the central address register ZAR employed for address comparison. In addition to the subscriber address registered in address register AR, the charge to be transmitted is now forwarded to the automatic calling arrangement ARE, or to the apparatus for automatic charge announcement, AGA. After the subscriber is called over the automatic calling arrangement ARE, the charge transmission is connected to the subscriber through the apparatus AGA.

Instead of direct oral charge transmission to the subscriber in the manner already described, a printing apparatus DE may also be controlled, the printing apparatus being such as a perforation tape writer with a date indicating apparatus DG connected thereto. In addition, the printing apparatus DE may cause actuation of a telegraph FS at the subscriber station, through operation of the automtaic calling apparatus ARE.

Several variations are possible in the mode of operation of the automatic charge transmission apparatus. Upon issuance of information as to the charge status of a particular subscriber, for charge transmission purposes, the information can be cancelled in the central charge register, or the information can be retained therein. In the first instance, the subscriber receives charges for the call just made, whereas in the second instance he receives notification of all charges run up to date, and if need arises must himself determine the difference in order to ascertain the charge for the last call. A further possibility for charge determination exists in two register positions individual to each subscriber. One of these two positions may receive the charge accrued during a call, while the other register position serves for additive registration of all of the charges.

The invention is particularly useful when the registers for the subscriber address and for charge information, are centrally located, particularly if they are parts of the central charge register.

In exchange systems provided with means for subscriber identification, the identification transmission required of a request for charge notification can be carried out, together with such identification, during initiation of the call.

It will be understood that many modifications could be made in the apparatus shown herein, without departure from the scope of the invention. Accordingly, the invention is not to be considered limited to the apparatus described herein, but rather only by the appended claims.

I claim:

1. A circuit arrangement for automatically informing subscribers of toll charges upon completion of calls in a cyclically operating central charge register system in which counting information indicative of the cost of a call is stored in a different storage position for each subscriber, each said position having an address corresponding to the address of the subscriber whose counting information is stored in that position, and including apparatus connected between the calling and called subscribers for making the call connection (AS, I. GW), wherein the improvement comprises, subscriber address comparison apparatus (K) operable to provide an output when the same subscriber address is simultaneously supplied to two inputs thereof, first means (TAR) having its input connected to said call connection apparatus for registering the address of a calling subscriber when a call connection is made and its output connected to said comparison apparatus for supplying the address of a calling subscriber desiring toll charge information to one of the inputs of said comparison apparatus, second means having its input connected to said central register (ZAR) for supplying to the other input of said comparison apparatus the address of said central register from which counting information can then be read, and charge informing apparatus (AGA) responsive to said output of said comparison apparatus for transmitting to said calling subscriber information read from the storage position corresponding to that address for which said output is obtained.

2. The apparatus of claim 1 in which said first means is one of several subscriber address registers, and including means for assigning a free one of said subscriber address registers to the calling subscriber requesting toll charge information.

3. The apparatus of claim 1 in which said central charge register is a rotating magnetic drum (T) having a number of tracks each having a plurality of storage positions, means sensitive to angular drum position connected to said second means (ZAR) to enable it to supply different addresses as the drum rotates, and reading apparatus responsive to counting information stored on the drum positions connected to said automatic charge announcing apparatus when said comparison apparatus provides an output.

4. The apparatus of claim 1 including a special calling apparatus (ARE) operable to call back a subscriber wishing toll charge information after completion of a call, so that the connection may be broken and such charge information later be supplied, said special calling apparatus being conected to said second means (ZAR) to receive the address therefrom of the station desiring toll charge information.

5. The apparatus of claim 1 in which said call connection apparatus includes several connection systems, and said first means is one of several subscriber address registers, each fixedly connected to a different one of said connection systems to cooperate exclusively therewith.

References Cited

UNITED STATES PATENTS

| | | | |
|---|---|---|---|
| 1,641,788 | 9/1927 | Thomas et al. | |
| 3,067,290 | 12/1962 | Greenaway et al. | 179—7 |
| 3,097,266 | 7/1963 | Lüscher | 179—7 |
| 3,106,613 | 10/1963 | Mann et al. | 179—7 |

FOREIGN PATENTS

| | | |
|---|---|---|
| 959,826 | 6/1964 | Great Britain. |

KATHLEEN H. CLAFFY, Primary Examiner

J. S. BLACK, Assistant Examiner